(12) United States Patent
Gruet et al.

(10) Patent No.: US 11,109,297 B2
(45) Date of Patent: Aug. 31, 2021

(54) METHOD OF COMMUNICATION BETWEEN A BATTERY POWERED TERMINAL AND A BASE STATION AND ASSOCIATED COMMUNICATION NETWORK

(71) Applicant: AIRBUS DS SAS, Elancourt (FR)

(72) Inventors: Christophe Gruet, Montigny le Bretonneux (FR); Eric Georgeaux, Montigny le Bretonneux (FR); Hervé Gromat, Bois d'Arcy (FR); Xavier Pons Masbernat, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 352 days.

(21) Appl. No.: 15/114,579

(22) PCT Filed: Dec. 12, 2014

(86) PCT No.: PCT/FR2014/000275
§ 371 (c)(1),
(2) Date: Oct. 24, 2016

(87) PCT Pub. No.: WO2015/114224
PCT Pub. Date: Aug. 6, 2015

(65) Prior Publication Data
US 2017/0041852 A1 Feb. 9, 2017

(30) Foreign Application Priority Data
Jan. 29, 2014 (FR) ........................................ 1400233

(51) Int. Cl.
*H04W 40/10* (2009.01)
*H04W 40/22* (2009.01)
(Continued)

(52) U.S. Cl.
CPC ........... *H04W 40/10* (2013.01); *H04W 8/005* (2013.01); *H04W 40/22* (2013.01);
(Continued)

(58) Field of Classification Search
CPC ..... H04W 52/0261; H04W 4/08; H04W 4/02; H04W 4/06; H04W 84/08; H04W 8/186;
(Continued)

(56) References Cited

U.S. PATENT DOCUMENTS 10,212,642 B2 * 2/2019 Li ......................... H04W 76/14
2010/0167743 A1 7/2010 Palanki et al.
(Continued)

FOREIGN PATENT DOCUMENTS

WO    WO 2012/170794 A1    12/2012

OTHER PUBLICATIONS

International Search Report as issued in International Patent Application No. PCT/FR2014/000275, dated Mar. 11, 2015.

*Primary Examiner* — Yemane Mesfin
*Assistant Examiner* — Mon Cheri S Davenport
(74) *Attorney, Agent, or Firm* — Pillsbury Winthrop Shaw Pittman LLP

(57) ABSTRACT

A method of communication between a user terminal powered by a battery and a base station allowing optimization of the management of the battery of the user terminal, includes a step of selecting from among terminals, termed surrounding terminals, powered by battery and situated in a zone within range of the base station, terminals whose distance with the user terminal is less than a predetermined distance and whose battery level is greater than a predetermined threshold, termed neighbour terminals, a step of configuring the neighbour terminals and the user terminal by way of a configuration setpoint, a step of transmitting data between the user terminal and the base station according to the
(Continued)

Figure 1:
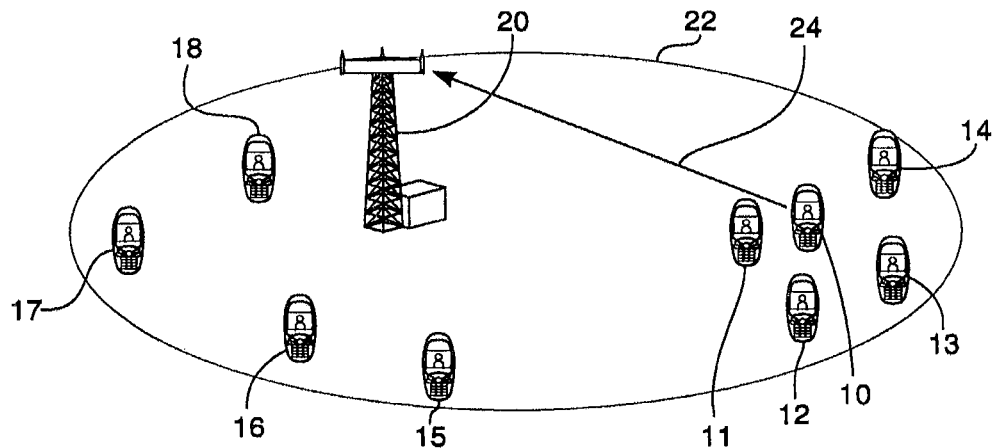

configuration setpoint defining at least one neighbour terminal through which the data pass.

7 Claims, 4 Drawing Sheets

(51) Int. Cl.
*H04W 52/02* (2009.01)
*H04W 8/00* (2009.01)
*H04W 76/14* (2018.01)
*H04W 76/23* (2018.01)
*H04W 88/04* (2009.01)
*H04W 88/02* (2009.01)
*H04W 88/08* (2009.01)

(52) U.S. Cl.
CPC ....... *H04W 52/0261* (2013.01); *H04W 76/14* (2018.02); *H04W 76/23* (2018.02); *H04W 88/02* (2013.01); *H04W 88/04* (2013.01); *H04W 88/08* (2013.01); *Y02D 30/70* (2020.08)

(58) Field of Classification Search
CPC ........ H04W 40/10; G06F 1/3203; G06F 1/26; Y02D 70/00; Y02D 70/1262; Y02D 70/142
See application file for complete search history.

(56) References Cited

U.S. PATENT DOCUMENTS

| | | | |
|---|---|---|---|
| 2011/0046800 A1* | 2/2011 | Imes | F24F 11/63 700/286 |
| 2012/0131364 A1* | 5/2012 | Gromat | H04W 52/0261 713/320 |
| 2013/0188552 A1 | 7/2013 | Kazmi et al. | |
| 2015/0373485 A1* | 12/2015 | Chung | H04W 4/80 455/41.2 |
| 2016/0095066 A1* | 3/2016 | Gruet | H04W 52/0261 455/574 |

* cited by examiner

METHOD OF COMMUNICATION BETWEEN A BATTERY POWERED TERMINAL AND A BASE STATION AND ASSOCIATED COMMUNICATION NETWORK

CROSS REFERENCE TO RELATED APPLICATIONS

This application is the U.S. National Stage of PCT/FR2014/000275, filed Dec. 12, 2014, which in turn claims priority to French Patent Application No. 1400233 filed Jan. 29, 2014, the entire contents of all applications are incorporated herein by reference in their entireties.

TECHNICAL FIELD OF THE INVENTION

The invention relates to a method of communication between a battery-powered user terminal, in particular a mobile terminal, and a base station, and an associated communication network. The invention has particularly advantageous applications for private radiocommunication digital mobile systems, known as "PMR" (Private Mobile Radio or Professional Mobile Radio). The object of the invention is of additional interest for wireless terminals, known as "mobile" terminals, intended for very high transmission speeds, such as broadband technologies, based on LTE (Long Term Evolution), or 4G (4th Generation cellular network).

TECHNOLOGICAL CONTEXT

In the field of private radiocommunication digital systems, called hereinafter PMR systems, there is a requirement to upgrade PMR networks based on low transmission rate technologies (Narrowband), from a legacy generation, into PMR networks based on high transmission rate technologies (Broadband), or very high transmission rate technologies. A PMR network based on narrowband is understood to mean a TETRA, or TETRAPOL, or P25, technology network. A PMR network based on broadband is understood to mean an IP-WAN technology network. IP-WAN networks are understood to mean networks using WIFI technologies (Wireless Fidelity), and/or WIMAX technologies (Worldwide Interoperability for Microwave Access), and/or 2G (2nd cellular network Generation), and/or 3G (3rd cellular network Generation), and/or LTE (Long Term Evolution), 4G (4th Generation) and/or future technologies.

The aim of this upgrade is to allow the inclusion of new services based on IP (Internet Protocol), but also to continue to support PMR network services from previous generations such as radio, together with all interfaces.

However, when upgrading such PMR networks for very high transmission rates such as LTE, or 4G, the most critical problem experienced is the short lifetime of the batteries powering the terminals using the above-mentioned technologies.

There is therefore a requirement to determine a technique or set of techniques enabling the energy from each terminal battery to be safeguarded.

GOALS OF THE INVENTION

The invention seeks to mitigate certain disadvantages of the communication methods between a known user terminal and a known base station. In particular, the invention seeks to provide, in at least one implementation of the invention, a method of communication enabling the energy used by a user terminal to be optimised.

ACCOUNT OF THE INVENTION

To accomplish this the invention relates to a method of communication between a
battery-powered user terminal and a base station, allowing optimisation of management of the battery of the said user terminal, characterised in that it includes:
  a step of selecting from among the terminals, called "surrounding terminals", which are battery-powered and located in an area within range of the base station, of terminals less than a predetermined distance from the said user terminal, and having battery levels higher than a predetermined threshold, called "proximate terminals",
  a step of configuration of the proximate terminals and of the user terminal by means of a configuration instruction,
  a step of transmission of data between the user terminal and the base station using the said configuration instruction defining at least one proximate terminal through which the said data passes.

A method of communication according to the invention therefore enables the battery power of a user terminal to be conserved by accomplishing a data transmission by means of other terminals located near to the user terminal, i.e. at distance from it of under a predetermined distance.

In addition to this notion of distance, the proximate terminals are selected according to their battery levels, which must be above a certain threshold. In different variants this threshold may be fixed, for example 30% of the battery's total capacity, or alternatively variable, for example the battery level of the user terminal defines a threshold, such that all the terminals through which the transmission is made have battery levels higher than the battery level of the user terminal. The result is therefore, in particular, a virtual sharing of the batteries through the use of one or more proximate terminals acting as relays for the transmission to the base station. This therefore enables the energy consumption of the user terminal to be reduced, due to the fact that the data is transmitted over a shorter distance, and using the energy of the proximate terminals, which have sufficiently high battery levels to transmit the data in this manner from the user terminal to the base station. The method also enables opportunistic use of the batteries of terminals located nearby which are in an idle state, i.e. which are not connected to any network, but which are nonetheless located in the same coverage area. These terminals in an idle state receive the configuration instruction, and change to connected mode if required by the said configuration instruction.

From a more general standpoint, the method allows much more efficient management of the battery level of the user terminal, in order that the said battery is not depleted too rapidly, during an intervention by a group of users (in particular police, gendarmerie, special unit, fire fighter or any other intervention unit authorised to use such a mobile terminal) in a geographical area, for example, and if it is low on energy during the said intervention or next times the said user terminal is used. During the said intervention the method can also allow optimisation of energy management of a particular high-priority terminal, which may be essential or sensitive, such as, for example, that of a team leader or intervention unit leader. For example, in this case, data transmitted by the priority terminal passes in every case through a proximate terminal, whatever the battery level of the proximate terminal, to protect the battery level of the priority terminal.

Advantageously, and according to the invention, the said configuration instruction defines at least one communication protocol to be used for the data transmission step.

According to this aspect of the invention, the configuration instruction defines the communication protocol which is most suitable for the data transmission, depending, for example, on the distance between the terminals, the number of terminals, and their battery levels.

Advantageously, and according to the invention, the said step of selection of the proximate terminals includes:
 a step of signalling accomplished by the user terminal towards the surrounding terminals,
 a step of calculation of the distance between each surrounding terminal and the user terminal,
and the step of configuration includes:
 a step of transmission of a report accomplished by each proximate terminal towards the base station, where the said report includes at least the battery level of the proximate terminal and its position,
 a step of determination of the said configuration instruction by the base station,
 a step of transmission of the said configuration instruction by the base station towards the proximate terminals and the user terminal.

According to this aspect of the invention, the configuration instruction is determined by the transmission of a report to the base station by each proximate terminal, followed by determination of the optimum configuration based on the data taken from these different reports, followed by transmission of the instruction to the terminals in question.

Advantageously, and according to one variant of the invention:
 the step of signalling of the user terminal to the surrounding terminals includes a sub-step of transmission of a help signal by the user terminal to the base station, followed by a sub-step of transmission of a resource control signal by the base station by means of the broadcast of the said signal in the base station's coverage area,
 the step of transmission of the said configuration instruction by the base station is accomplished only towards the proximate terminals and the user terminal.

The term "broadcast" of the signal is understood to mean transmission of the signal by the base station across the base station's entire coverage area, without any addressing of individual terminals, but which is received by the surrounding terminals located in this area. This type of transmission is commonly known as broadcasting.

According to this variant of the invention, the base station is responsible for transmitting a signal to the surrounding terminals after the reception of a help signal sent by the user terminal. This enables a check to be made that the majority of the terminals close to the user terminal, which may be selected as proximate terminals, receive the help signal.

The help signal preferably includes at least the following information:
 an identifier of the user terminal,
 the position of the user terminal (determined, for example, by the GPS or A-GPS geolocation systems, by detection of the proximate networks, etc.),
 a list of communication possibilities of the user terminal, in particular a list of the type of network to which the said user terminal can connect in light of its battery level (for example LTE, WiFi, Bluetooth, etc.),
 the said predetermined distance to determine the proximate terminals,
 the battery level of the said user terminal.

The resource control signal preferably includes at least the same information as the help signal.

Advantageously, and according to one variant of the invention:
 the step of signalling by the user signal to the surrounding terminals includes a step of transmission by the user terminal of a probing signal with a low range defined according to the said predetermined distance,
 the step of transmission of the configuration instruction by the base station is accomplished by means of the broadcast of the said instruction in the base station's coverage area.

According to this variant of the invention, the signalling is accomplished by a low-range signal, in particular one which is suitable to be received by the terminals close to the user terminal, which may be selected as proximate terminals. This means that there is no requirement to transmit any signal to the base station. When the configuration instruction has been established it is transmitted by broadcasting in order to be received by the surrounding terminals, and in particular by the proximate terminals and the user terminal which are concerned by this configuration instruction.

Advantageously, and according to one variant of the invention, the step of selection of the proximate terminals includes a step of transmission by the user terminal of a request signal with a low range, defined according to the said predetermined distance, where the said request signal includes the said configuration instruction defining the information relative to a short-range network to which the proximate terminals must connect for the transmission of the data with the user terminal.

According to this aspect of the invention the terminals operate independently of the base station for the configuration, since the instruction is delivered directly by the user terminal to the terminals located within a short range.

Advantageously, and according to one variant of the invention:
 the step of selection of the proximate terminals includes a sub-step of the transmission by the user terminal of a connection signal including the said configuration instruction defining information relating to a short-range network to which the proximate terminals must connect to transmit the data with the user terminal, towards the base station, a sub-step of broadcast of the said connection signal in the base station's coverage area, and a sub-step of calculation of the distance between each surrounding terminal and the user terminal,
 the step of configuration includes a step of connection of the proximate terminals to the said short-range network.

According to this aspect of the invention the base station allows the connection signal to be broadcast in the coverage area, but connections between the surrounding terminals and the base station are avoided by directly transmitting the information relating to a network to which the proximate terminals must connect.

The connection signal preferably includes at least the following information in addition to the information relating to the network to which the proximate terminals must connect:
 an identifier of the user terminal, a position of the user terminal (determined, for example, by the GPS or A-GPS geolocation systems, by detection of the proximate networks, etc.), the said predetermined distance to determine the proximate terminals, the battery level of the said user terminal.

Advantageously, and according to the invention:

the configuration instruction defines a short-range communication protocol and a long-range communication protocol, and the step of data transmission includes:

a sub-step of transmission of the data between the user terminal and one or more proximate terminals by the short-range communication protocol, a sub-step of transmission of the data between the proximate terminal or terminals and the base station by the long-range communication protocol.

According to this aspect of the invention the short-range communication protocol enables the user terminal to transmit the data using less energy than by using a long-range communication protocol to transmit the data directly to the base station.

In this case each proximate terminal uses a long-range communication protocol, and therefore uses a proportion of their energy to transmit the data from the user terminal.

Advantageously, and according to one variant of the invention, the said configuration instruction configures the terminals such that, in the data transmission step, the said data passes through a single proximate terminal at once.

According to this aspect of the invention, the data transmission step can use most of the communication protocols which allow data transmission between two terminals, without requiring use of a protocol implementing multiple connections. This therefore enables the communication protocol which is best suited to the current situation and to the desired effects to be used, for example the most energy-efficient protocol.

Advantageously, and according to this latter aspect of the invention, the said configuration instruction configures the terminals such that, in the data transmission step, the data passes alternately through each proximate terminal for a time interval correlated with the battery level of each proximate terminal.

According to this aspect of the invention, the data transmission is distributed between the different proximate terminals according to their battery level, so as to transmit for a longer time by means of a proximate terminal having a higher battery level, and for a shorter time by means of a proximate terminal having a lower battery level (but still above the predetermined threshold defined above).

Advantageously, and according to one variant of the invention, the said configuration instruction configures the terminals such that, in the data transmission step, the said data passes simultaneously through several proximate terminals and directly between the user terminal and the base station by using a multi-path communication protocol.

According to this aspect of the invention a multi-path communication protocol consists in transmitting the data simultaneously along several paths, in this case through several proximate terminals, in order to improve the transmission, for example in terms of data transmission rate, terminals' load distribution, quality of transmission (due to the possible redundancies and therefore error correction redundancies).

The invention also relates to a communication network including a base station and a set of battery-powered terminals located within range of the base station, characterised in that at least one of the terminals uses the method according to the invention.

The terminals in the communication network can use the method for various reasons, such as, for example, a low battery level (below a predetermined threshold), or due to the fact that the terminal is a priority terminal, whether essential or sensitive, among all the terminals, such as the terminal of a team leader, for example, for which it is important to conserve the battery power in order to keep it operational for as long as possible.

The invention also relates to a method and a communication network characterised in combination by all or some of the characteristics mentioned above or below.

LIST OF FIGURES

Figure 2:
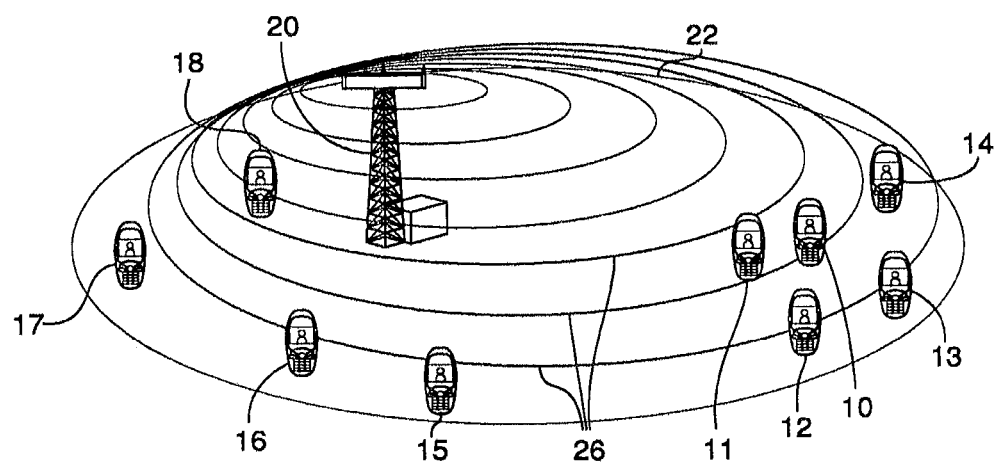
Figure 3:
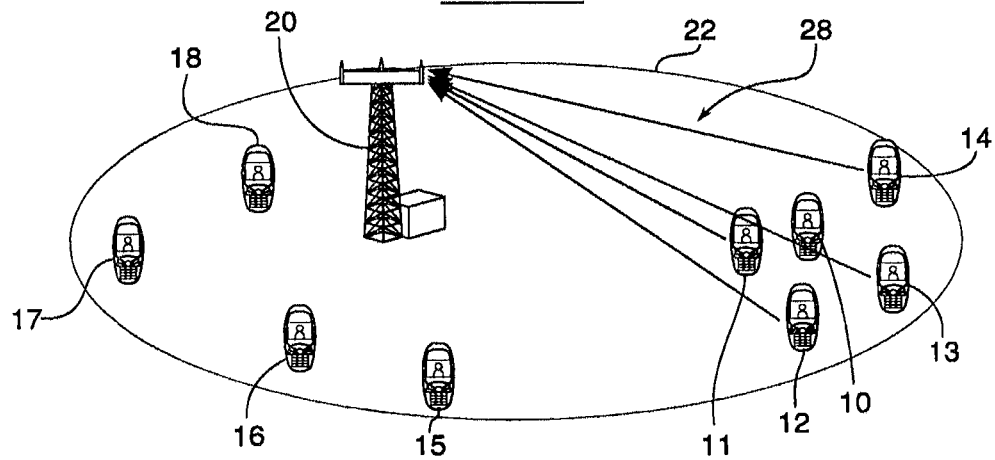
Figure 4:
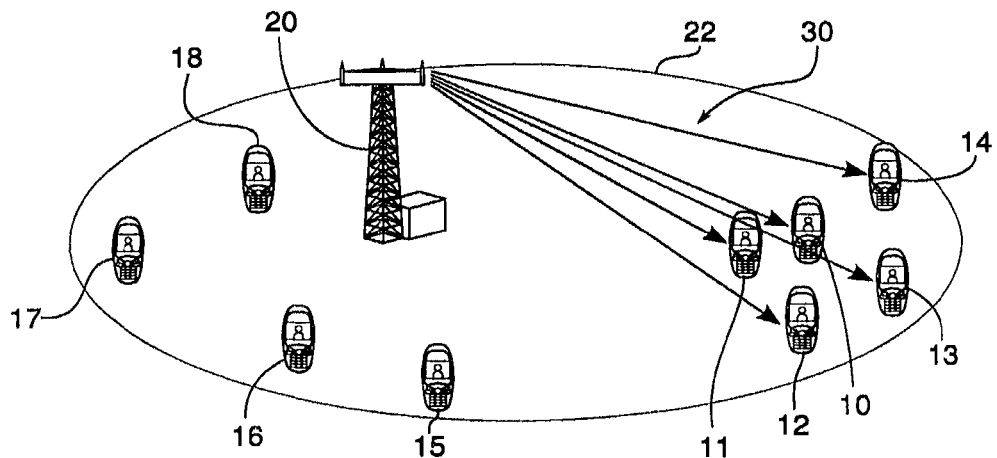
Figure 5:
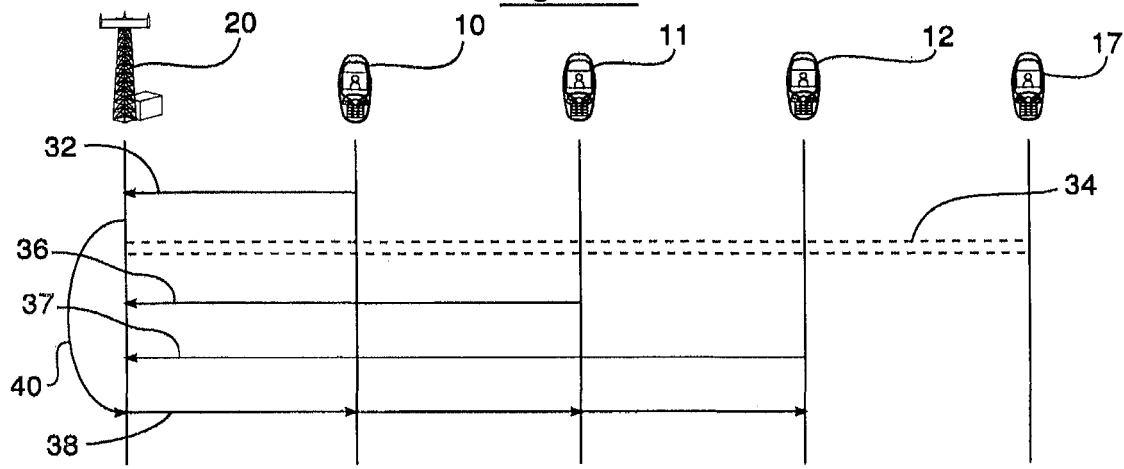
Figure 6:
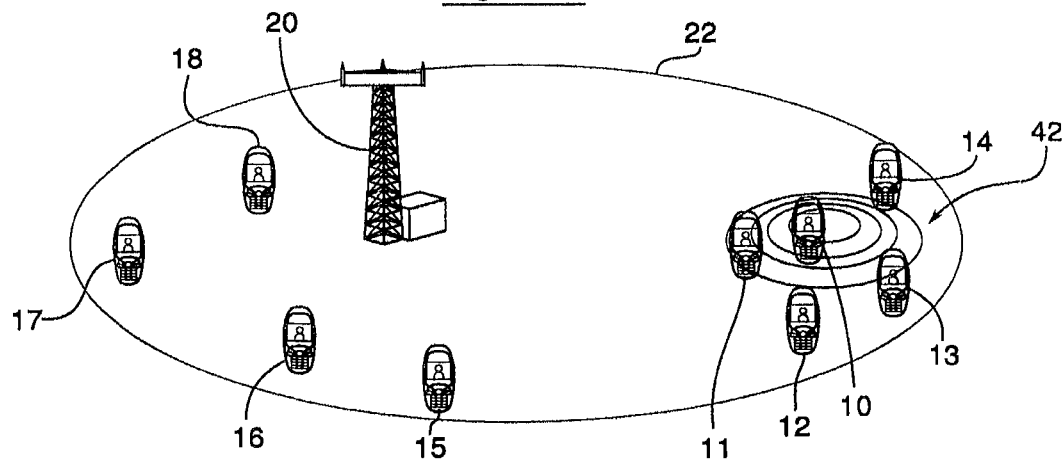
Figure 7:
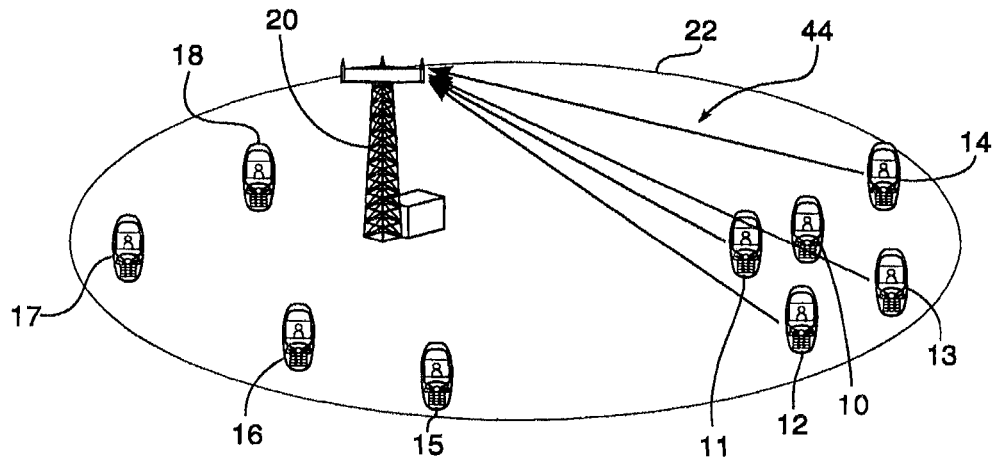
Figure 8:
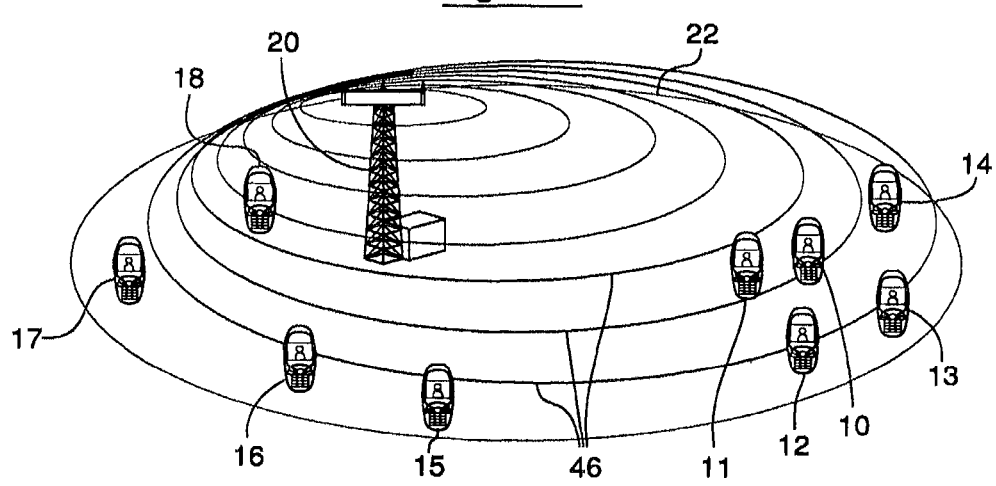
Figure 9:
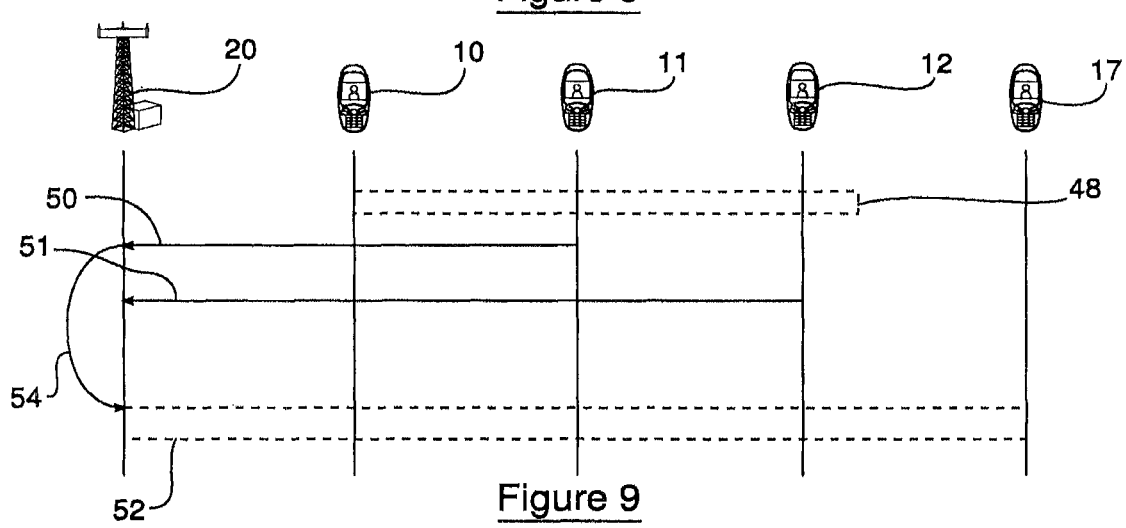
Figure 10:
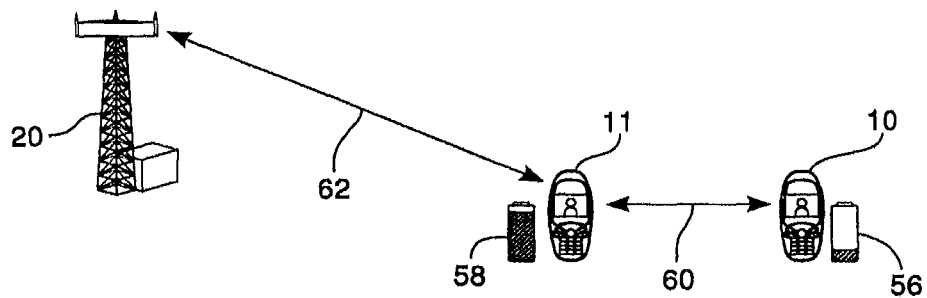
Figure 11:
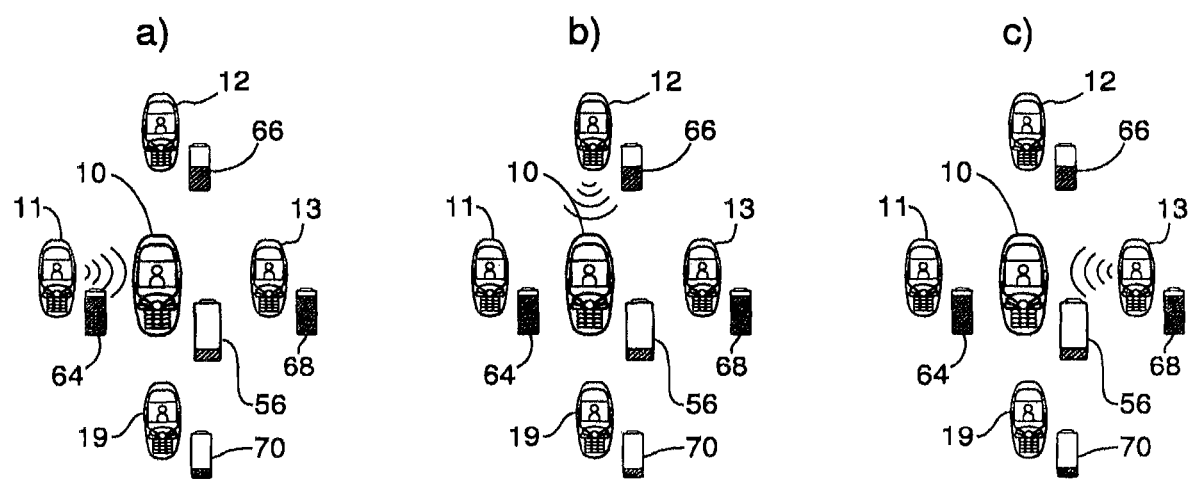
Figure 12:
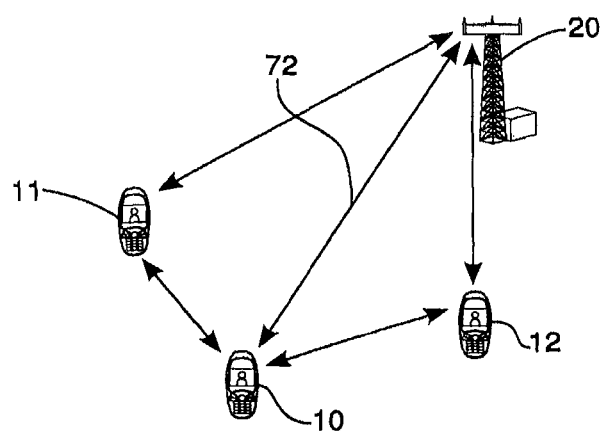

Other aims, characteristics and advantages of the invention will come to light on reading the description which follows, given on a non-restrictive basis, which makes reference to the appended figures, of which:

FIGS. 1 and 2 represent diagrammatically sub-steps of a signalling step accomplished by a user terminal in a method according to one implementation of the invention, FIG. 3 represents diagrammatically a step of transmission of a report accomplished by proximate terminals in a method according to one implementation of the invention, FIG. 4 represents diagrammatically a step of transmission of a configuration instruction in a method according to one implementation of the invention, FIG. 5 represents diagrammatically a sequence diagram of steps of the method according to one implementation of the invention, FIG. 6 represents diagrammatically a signalling step accomplished by a user terminal in a method according to another implementation of the invention, FIG. 7 represents diagrammatically a step of transmission of a report accomplished by proximate terminals in a method according to another implementation of the invention, FIG. 8 represents diagrammatically a step of transmission of a configuration instruction in a method according to another implementation of the invention, FIG. 9 represents diagrammatically a sequence diagram of steps of the method according to another implementation of the invention FIG. 10 represents diagrammatically a data transmission step in a method according to a first implementation, FIG. 11 represents diagrammatically a data transmission step in a method according to a second implementation, FIG. 12 represents diagrammatically a data transmission step in a method according to a third implementation.

DETAILED DESCRIPTION OF AN IMPLEMENTATION OF THE INVENTION

It should be noted that the figures are not to scale.

The following implementations are examples: Although the description refers to one or more implementations, this does not necessarily mean that each reference relates to the same implementation, or that the characteristics apply only to one implementation. Single characteristics of different implementations can also be combined to provide other implementations.

A communication method according to one implementation of the invention is divided into several steps, where each step may form the subject of one or more implementations described in the remainder of this description.

The communication method enables data to be transmitted between a battery-powered user terminal and a base station. The goal of this method is to allow management of the user terminal's battery to be optimised, by a succession of steps, some of which occur before a step of data transmission between the user terminal and the base station. To allow management of the user terminal's battery to be optimised, the step of transmission between the user terminal and the base station is accomplished according to a configuration instruction which enables one or more proximate terminals through which the data will pass to be defined. These proximate terminals are terminals forming part of a set of terminals, called surrounding terminals, which are located in the base station's coverage area, i.e. in the area in which a terminal can communicate with the base station. The set consisting of the surrounding terminals, in particular including the user terminal and the proximate terminals, and the base station, constitute a communication network made to implement the method described hereinafter according to the invention.

To determine which of the surrounding terminals are the proximate terminals, the method includes a step of selection of the proximate terminals. This step of selection is based, in particular, on two characteristics which can qualify a proximate terminal: a distance from the user terminal less than a predetermined distance, and a battery level higher than a predetermined threshold.

In addition, the method also includes
a step of configuration of the proximate terminals and of the user terminal by means of a configuration instruction.

Both these steps are the subject of several implementations.

A first implementation of these two steps is described below with reference to FIGS. 1 to 5.

More specifically, FIGS. 1 and 2 represent an implementation of the step of selection of the proximate terminals. A base station 20 is configured such that it can accomplish communications with a set of surrounding terminals 10, 11, 12, 13, 14, 15, 16, 17 and 18 located in an area 22 within range of base station 20. Among these surrounding terminals is a user terminal 10, which implements the method according to one implementation of the invention.
To accomplish the step of selection of the proximate terminals, user terminal 10 accomplishes a step of signalling towards the surrounding terminals, including two sub-steps:
  a sub-step of transmission of a help signal by user terminal 10 towards base station 20. Transmission of the help signal is represented with reference to FIG. 1 by an arrow 24 from user terminal 10 to base station 20
  a sub-step of transmission of a resource control signal (RRC, or Radio Resource Control) by base station 20 using a form of distribution known by the term "broadcasting", which enables the signal to be transmitted to the entire area 22 within range of base station 20, without requiring that the signal is sent to each surrounding terminal present in area 22. The transmission of the resource control signal by means of broadcast is represented with reference to FIG. 2 by a set of ellipses 26 covering area 22 within range of base station 20.

Since the resource control signal can be sent at any time by base station 20 the surrounding terminals must be capable of receiving it at any time.

All the surrounding terminals therefore receive the resource control signal, which includes at minimum all the information included in the help signal sent by user terminal 10. In order not to reduce their battery levels unnecessarily terminals with a low battery level do not accomplish any other step of the method after receiving the resource control signal. A low battery level is a level below a predetermined threshold, which can be either a fixed threshold, for example 30% of the battery's total capacity, or a threshold dependent on the battery level of user terminal 10, for example such that all the terminals with a battery level lower than user terminal 10 are not used in the next stages of the method, or a threshold dependent on another parameter.

The surrounding terminals with a sufficient battery level calculate, from the received information (position of the user terminal 10, predetermined distance), whether they are at a distance below the predetermined distance of user terminal 10.

Terminals meeting the battery level and distance constraints are selected as proximate terminals 11, 12, 13 and 14. An additional criterion for selection can also be a check that the proximate terminal has at least one possibility of communication in common with user terminal 10, in terms of the type of network with which the terminals will be able to communicate.

FIGS. 3 and 4 represent an implementation of the configuration step.

Proximate terminals 11, 12, 13 and 14 selected in the selection step each send a report to base station 20 in a step of transmission of the report. Transmission of the report to base station 20 is represented with reference to FIG. 3 by arrows going from proximate terminals 11, 12, 13 and 14 to base station 20.

The report includes in particular the following information
  the identifier and position of the proximate terminal,
  the identifier and position of user terminal 10,
  the list of communication possibilities between the proximate terminal and user terminal 10,
  the battery level of the proximate terminal.

Base station 20 receives the reports over a limited time, defined by a wait period commenced in the step of transmission of the resource control signal. At the end of this wait period base station 20 calculates the best strategy to use in light of the reports obtained. This best strategy allows a configuration instruction to be defined, which will be sent to proximate terminals 11, 12, 13 and 14, and to user terminal 10, defining the proximate terminal or terminals which should be used for data transmission, and the communication protocols to be used.

Base station 20 transmits this configuration instruction towards proximate terminals 11, 12, 13 and 14 in a step of transmission of the configuration instruction. Transmission of the instruction is represented with reference to FIG. 4 by arrows 30 going from base station 20 to proximate terminals 11, 12, 13 and 14, and user terminal 10.

FIG. 5 represents a sequence diagram of the first implementation of the step of selection of the proximate terminals, and the step of configuration described in the previous paragraphs. Base station 20 and the four terminals 10 (the user terminal), 11, 12, and 17 from among the surrounding terminals are represented, and the communications between these terminals are represented symbolically by arrows or dotted lines:
  arrow 32 represents the sub-step of transmission of the help signal of user terminal 10 to base station 20, described above with reference to FIG. 1,
  dotted lines 34 represent the sub-step of transmission of the resource control signal by broadcast throughout area 22 within range of base station 20, described above with reference to FIG. 2, arrows 36 and 37 represent the step of transmission of the report by each proximate terminal 11 and 12 towards base station 20, described above with reference to FIG. 3, arrow 38 represents the step of transmission of the configuration instruction by base station 20 to proximate terminals 11 and 12 and user terminal 10, described above with reference to FIG. 4, arrow 40 represents the wait period commenced by base station 20 on transmission of the resource control signal, conclusion of which initiates the definition of the configuration instruction, followed by its transmission.

In another implementation, user terminal 10 transmits a control signal to base station 20, which broadcasts it in coverage area 22, in a manner comparable to the implementation described with reference to FIGS. 1 and 2. This control signal includes the same information as the help signal described above, adding a configuration instruction including information relating to a short-range network to which the proximate terminals must connect in order to transmit data with the user terminal. Proximate terminals 11, 12, 13 and 14, which receive this control signal, then connect directly to the network notified by user terminal 10, without accomplishing the step of transmission of a report by proximate terminals 11, 12, 13 and 14, nor the step of transmission of the instruction by base station 20 of the implementation described above with reference to FIGS. 3 and 4.

The step of selection of the proximate terminals and the step of configuration are also the subject of a second implementation, described below with reference to FIGS. 6 to 9.

FIG. 6 represents the step of signalling by user terminal 10, which is accomplished towards the surrounding terminals, and which includes a step of transmission by user terminal 10 of a probing signal 42 of low range defined according to the predetermined distance. In other words, this low range is defined such that it seeks to reach only terminals which are potential proximate terminals. This probing signal 42 is known by the surrounding terminals, and leads to the transmission of a report towards base station 20 by each proximate terminal 11, 12, 13 and 14, i.e. each terminal meeting the distance and battery level criteria set out above. Transmission of the report is represented by arrows 44 going from the proximate terminals to base station 20, with reference to FIG. 7. This transmission is comparable to the transmission of the report represented with reference to FIG. 3.

The report includes in particular the following information:

the identifier and position of the proximate terminal,
the list of communication possibilities between the proximate terminal and user terminal 10,
the battery level of the proximate terminal,
the content of probing signal 42,
the time at which probing signal 42 was sent, Base station 20 receives the reports during a limited time, defined by a wait period commenced on receipt of the first report from one of proximate terminals 11, 12, 13 or 14. At the end of this wait period base station 20 calculates the best strategy to use in light of the reports obtained.

This best strategy allows a configuration instruction to be defined, which will be sent to proximate terminals 11, 12, 13 and 14, and to user terminal 10, defining the proximate terminal or terminals which should be used for data transmission, and the communication protocols to be used.

FIG. 8 represents the step of transmission of configuration instruction by base station 20, using a broadcast to transmit the configuration instruction in the area within range of the base station. Transmission of the configuration instruction by means of broadcast is represented with reference to FIG. 8 by a set of ellipses 46 covering area 22 within range of base station 20. This instruction is thus received by all the surrounding terminals, but only proximate terminals 11, 12, 13 and 14 and user terminal 10 take account of it and apply it.

FIG. 9 represents a sequence diagram of the second implementation of the step of selection of the proximate terminals and the step of configuration described in the above paragraphs. Base station 20 and the four terminals 10 (the user terminal), 11, 12, and 17 from among the surrounding terminals are represented, and the communications between these terminals are represented symbolically by arrows or dotted lines:

dotted lines 48 represent the step of transmission of probing signal 42, described above with reference to FIG. 6, arrows 50 and 51 represent the step of transmission of the report by each proximate terminal 11 and 12 towards base station 20, described above with reference to FIG. 7, dotted lines 52 represent the step of transmission of the configuration instruction by base station 20 by means of the broadcast of the said instruction in area 22 within range of base station 20, described above with reference to FIG. 8, arrow 54 represents the wait period commenced by base station 20 on receipt of the first report from proximate terminal 11, conclusion of which initiates the definition of the configuration instruction, followed by its transmission.

In another implementation user terminal 10 may transmit a request signal with a low range defined according to the said predetermined distance, in a manner comparable to that which was described with reference to FIG. 6.

This request signal includes the same information as probing signal 42 described above, adding a configuration instruction including information relating to a short-range network to which the proximate terminals must connect in order to transmit the data with user terminal 10. Proximate terminals 11, 12, 13 and 14, which receive this control signal, then connect directly to the network notified by the user terminal, without accomplishing the step of transmission of a report by proximate terminals 11, 12, 13 and 14, nor the step of transmission of the instruction by base station 20, described above with reference to FIGS. 7 and 8.

The remainder of the description relates to various configurations which the terminals can adopt after the step of configuration by means of the configuration instruction, in order to accomplish the step of data transmission between the user terminal and the base station, with the data passing through at least one proximate terminal. These transmissions relate to an uplink, i.e. from the user terminal to the proximate terminal, or to the base station, and from the proximate terminal to the base station, together with a downlink, i.e. from the base station to the proximate terminal, or to the user terminal, and from the proximate terminal to the user terminal.

FIG. 10 represents a first implementation of the step of data transmission between user terminal 10 and the base station, in which the configuration instruction has configured terminals such that the data passes through a single proximate terminal 11. User terminal 10 and single proximate terminal 11 are represented with their battery levels; in this instance a low battery level 56 for user terminal 10 and a high battery level 58 for single proximate terminal 11. To optimise its energy consumption user terminal 10 is configured for a transmission 60 of data with proximate terminal 11, where this proximate terminal 11 is itself configured for a transmission 62 of data with base station 20.

The energy consumption of user terminal 10 is generally improved due to the small distance between user terminal 10 and proximate terminal 11 (compared to the distance between user terminal 10 and base station 20), or due to the use of a communication protocol consuming less energy when data is transmitted between the user terminal and the proximate terminal than the protocol which is generally used for transmission between a surrounding terminal and the base station. In practice transmission between a surrounding terminal and the base station is accomplished by a long-range communication protocol, for example the LTE protocol. In the step of transmission of the method according to this implementation, transmission 62 between proximate terminal 11 and base station 20 is accomplished by the long-range communication protocol, for example the LTE protocol, whereas transmission 60 between proximate terminal 11 and user terminal 10 is accomplished by a communication protocol which consumes less energy, typically a short-range communication protocol, such as, for example, the WiFi, Bluetooth or LTE relay mode protocols, etc. LTE relay mode is one of the mechanisms included in the LTE protocol, and it enables proximate terminal 11 to behave like a virtual base station for user terminal 10, which can therefore transmit the data using the LTE protocol, but over a shorter distance, after which the data is transferred to base station 20. This allows use of a single protocol for data transmission.

FIG. 11 represents diagrammatically a user terminal 10, its battery level 56 and proximate terminals 11, 12 and 13 configured by the configuration instruction to accomplish the data transmission step according to another implementation, using several proximate terminals 11, 12 and 13 through which the data passes. This implementation is, in particular, used when several proximate terminals have been selected in the step of selection of the proximate terminals, and when all have satisfactory characteristics enabling user terminal 10 to be assisted. proximate terminals 11, 12 and 13 are then configured by the configuration instruction to transmit the data alternately, during predefined time intervals.

This enables battery consumption to be made uniform, by distributing the load over several proximate terminals. To optimise battery consumption the predefined time intervals are advantageously determined taking account of the battery levels of proximate terminals 11, 12 and 13, where a proximate terminal with a higher battery level transmits the data for a longer time interval than a proximate terminal with a lower battery level. Steps a), b) and c) represented in FIG. 11 represent the data transmissions accomplished respectively by proximate terminal 11, with a high battery level 64, and then 12, with an intermediate battery level 66, and lastly 13, with a high level 68. A terminal 19 is located close to user terminal 10 but has a battery level 70 which is too low for it to be selected as a proximate terminal. Data transmissions by means of comparable terminals are made, for example, by means of long-range and short-range communication protocols in a manner comparable to the previous description with reference to FIG. 10.

FIG. 12 represents another implementation, in which proximate terminals 11, 12 and user terminal 10 are configured for the data transmission using a multi-path communication protocol. Multi-path communication allows data to be transmitted between user terminal 10 and base station 20 over several different paths, i.e., in our method, through several different proximate terminals 11, 12, or by direct transmission 72 with base station 20. Unlike the implementation described with reference to FIG. 11, these transmissions through several proximate terminals can be accomplished simultaneously and not alternately.

The multi-path protocol can be used for various reasons: adding redundancy when transmitting data, so as to prevent transmission errors and resending of data, which can consume energy, or to divide the data into samples or packets, and transmit these samples over several different paths to optimise data transmission, in particular in terms of the transmission rate or quality.

Proximate terminals 11 and 12 and user terminal 10 can process the data in different ways, depending on the configurations used.

For transmission in the direction from user terminal 10 to base station 20, proximate terminals 11 and 12 can:
  receive data from user terminal 10 in the form of a series of useful bits, encode them, modulate them and then transmit them to base station 20,
  receive data from user terminal 10 in the form of a series of encoded bits, modulate them and then transmit them to base station 20,
  receive data from user terminal 10 in the form of a series of encoded and modulated bits, and transmit them to base station 20.

In the same way, for the transmission in the direction from base station 20 to user terminal 10, proximate terminals 11 and 12 can:
  receive the data from base station 20, demodulate it, decode it and transmit it to user terminal 10 accompanied with information on the quality of the transmission and the value of a cyclic redundancy check of the received encoded data, in order to enable user terminal 10 to select from among the different redundant data the data which is of best quality, with the fewest possible errors,
  receive the data from base station 20, demodulate it and transmit it to user terminal 10 accompanied with information on the quality of the transmission in order to enable user terminal 10 to combine the data received over different paths taking account of its quality,
  receive the data from base station 20 and transmit it to user terminal 10, with proximate terminals 11 and 12 then acting as additional relays.

The invention is not limited solely to the described implementations. In particular, the different implementations presented for each step of the method may be combined in all possible ways within the context of the invention.

The invention claimed is:

1. A method of communication between a battery-powered user terminal and a base station, allowing optimisation of management of the battery of the user terminal, the method comprising:
  selecting from among surrounding terminals, which are battery-powered and located in an area within range of the base station, proximate terminals that are less than a predetermined distance from the user terminal, and having battery levels higher than a predetermined threshold, said selecting including:
    a step of signalling accomplished by the user terminal towards the surrounding terminals, said step of signalling comprising a sub-step of transmission of a help signal by the user terminal to the base station, followed by a sub-step of transmission of a resource control signal by the base station by means of the broadcast of the signal in the coverage area of the base station, a step of calculation of the distance between each surrounding terminal and the user terminal, configuring the proximate terminals and the user terminal by means of a configuration instruction, the configuring including:

a step of transmission of a report accomplished by each proximate terminal towards the base station, wherein the report includes at least the battery level of the proximate terminal and a position of the proximate terminal, a step of determination of the configuration instruction by the base station, and a step of transmission of the configuration instruction by the base station only towards the proximate terminals and the user terminal;

transmitting data between the user terminal and the base station using the configuration instruction defining at least one proximate terminal through which the data passes, the transmitting including:

a first sub-step of transmission of the data between the user terminal and one or more of the proximate terminals by a short-range communication protocol, and after the first sub-step, a second a sub-step of transmission of the data between the one of more of the proximate terminals and the base station by a long-range communication protocol.

2. The method according to claim 1, wherein selecting the proximate terminals includes a step of transmission by the user terminal of a request signal with a low range, defined according to the predetermined distance, where the request signal includes the configuration instruction defining the information relative to a short-range network to which the proximate terminals must connect for the transmission of the data with the user terminal.

3. The method according to claim 1, wherein:

selecting the proximate terminals includes a sub-step of the transmission by the user terminal of a connection signal including the configuration instruction defining information relating to a short-range network to which the proximate terminals must connect to transmit the data with the user terminal, towards the base station, and a sub-step of broadcast of the connection signal in the base station's coverage area, and the step of configuration includes a step of connection of the proximate terminals to the short-range network.

4. The method according to claim 1, wherein said configuration instruction configures the terminals such that, in the data transmission step, the data passes through a single proximate terminal at once.

5. The method according to claim 1, wherein said configuration instruction configures the terminals such that, in the data transmission step, the data passes alternately through each proximate terminal for a time interval correlated with the battery level of each proximate terminal.

6. The method according to claim 1, wherein said configuration instruction configures the terminals such that, in the data transmission step, the data passes simultaneously through several proximate terminals and directly between the user terminal and the base station by using a multi-path communication protocol.

7. A communication network, including a base station and a set of battery-powered terminals and located within range of the base station, wherein at least one of the terminals uses the method according to claim 1.

* * * * *